(12) United States Patent
Yamada et al.

(10) Patent No.: US 8,613,353 B2
(45) Date of Patent: Dec. 24, 2013

(54) PARKING LOCK DEVICE FOR TRANSMISSION

(75) Inventors: Haruhiko Yamada, Kanagawa (JP);
Hidetaka Koga, Kanagawa (JP);
Masahiko Hayashi, Kanagawa (JP);
Hidetoshi Uji, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 1077 days.

(21) Appl. No.: 12/223,302

(22) PCT Filed: Mar. 16, 2007

(86) PCT No.: PCT/JP2007/056117
§ 371 (c)(1),
(2), (4) Date: Jul. 28, 2008

(87) PCT Pub. No.: WO2007/111284
PCT Pub. Date: Oct. 4, 2007

(65) Prior Publication Data
US 2009/0050435 A1  Feb. 26, 2009

(30) Foreign Application Priority Data
Mar. 28, 2006  (JP) ................................. 2006-087189

(51) Int. Cl.
*F16H 63/34* (2006.01)
*B60T 1/06* (2006.01)
(52) U.S. Cl.
USPC ..................................... 192/219.5; 74/411.5

(58) Field of Classification Search
USPC ....................................................... 192/219.5
See application file for complete search history.

(56) References Cited

U.S. PATENT DOCUMENTS 6,419,068 B1 * 7/2002 Stephan et al. ............ 192/219.5
6,536,576 B2 * 3/2003 Ono ............................ 192/219.5

FOREIGN PATENT DOCUMENTS

EP  1 628 048  2/2006
JP  4-31153 A  *  2/1992
JP  2001-341619  12/2001

OTHER PUBLICATIONS

European Search Report dated Mar. 30, 2011.

* cited by examiner

*Primary Examiner* — Rodney Bonck
(74) *Attorney, Agent, or Firm* — McGinn IP Law Group, PLLC

(57) ABSTRACT

A parking lock device is mounted on a transmission of a vehicle. The transmission includes a housing and an output shaft. The park lock device includes a parking pawl including a pawl portion, a first coupling member coupled to a rear end portion of the output shaft of the transmission, and a second coupling member coupled directly to the first coupling member, the second coupling member being supported by the housing of the transmission through a bearing and being provided with an extended shaft portion formed in a same shape as the rear end portion of the output shaft of the transmission, and a coupling coupled to the extended shaft portion of the second coupling member.

17 Claims, 9 Drawing Sheets

Fig. 2(a)
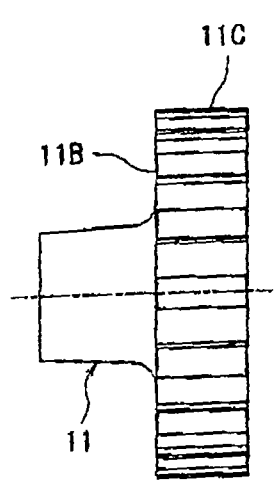
Fig. 2(b)
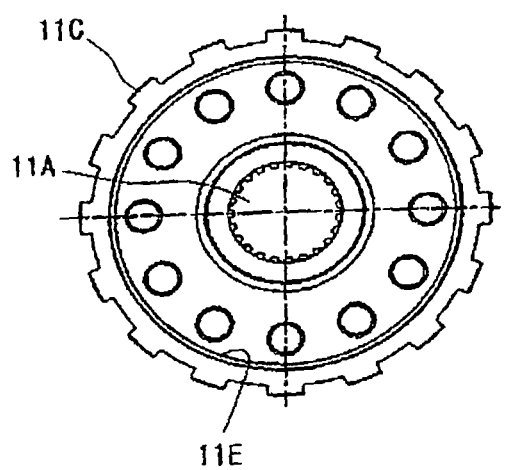
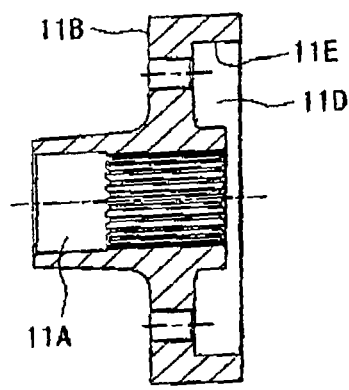
Fig. 2(c)

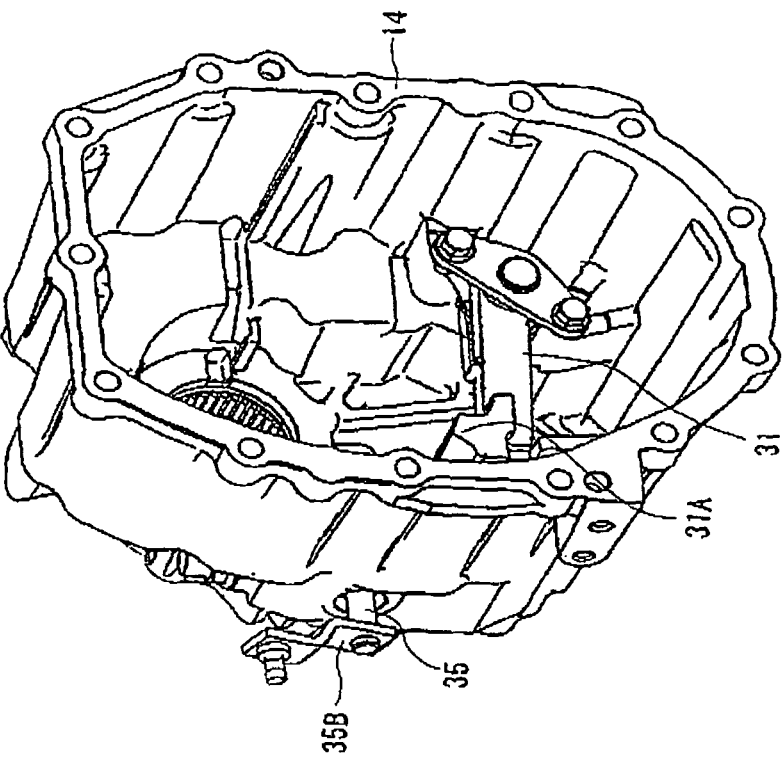
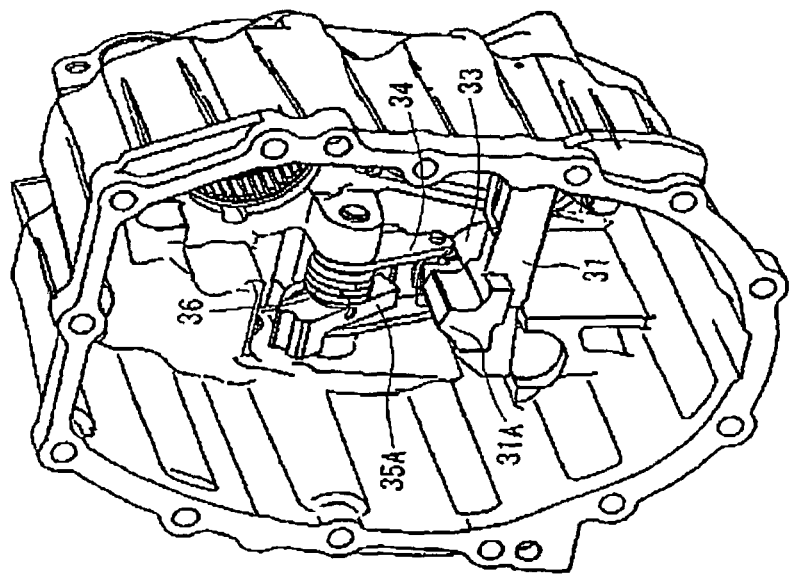

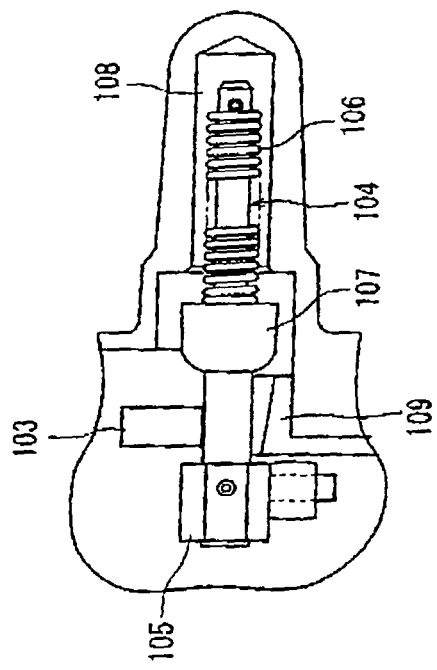
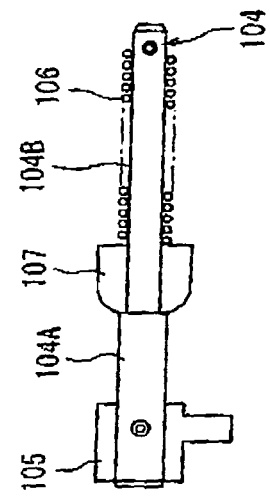
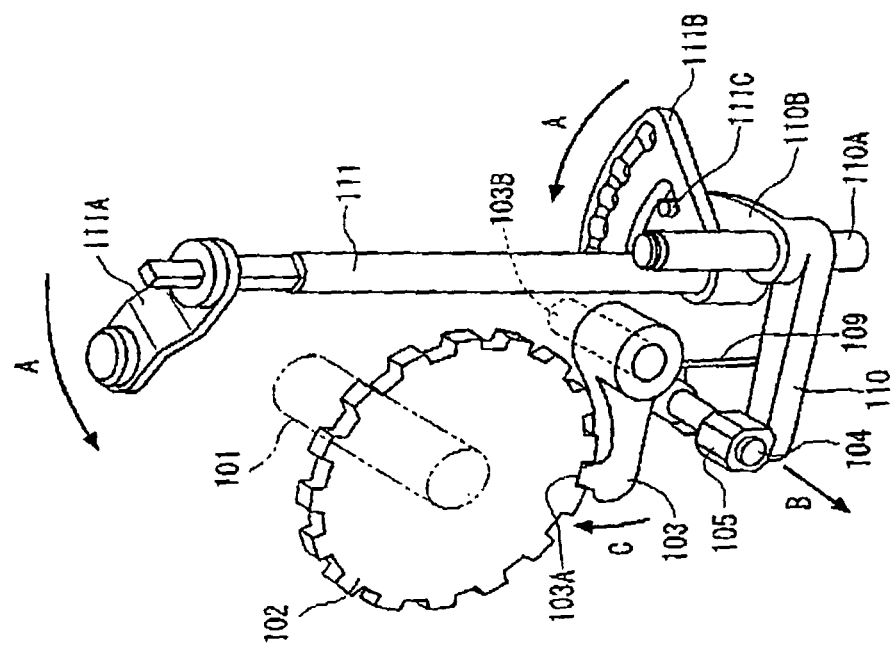

PARKING LOCK DEVICE FOR TRANSMISSION

TECHNICAL FIELD

This invention relates to a parking lock device mounted on a transmission interposed in a power transmission device of a vehicle for reliably maintaining the vehicle in a halted state when, for example, the vehicle is parked.

BACKGROUND ART

A variety of kinds of power transmissions have been employed for the vehicles, in which the clutch or the transmission that transmits the power of the engine to the wheels is automatically operated for easy driving in order to facilitate the driving of a vehicle and to reduce fatigue to the driver. A representative example may be an automatic transmission comprising a torque converter which is a fluid transmission device and a planetary gear mechanism, as is widely used as the power transmission device for the so-called automatic transmission vehicles (AT vehicles).

One of the power transmission devices for vehicles designed for achieving easy driving is a power transmission device which employs the transmission of the type of parallel shaft gear mechanism similar to that of the so-called manual transmission vehicle (MT vehicle) in combination with an automatic clutch to eliminate the need of operating the clutch at the time when the driver changes the gear by using the speed-change lever. A power transmission device has also been proposed in which the gear is automatically changed over depending upon the traveling state of the vehicle by using an electronic control unit and an actuator for operating the transmission instead of operating the speed-change lever by the driver. In recent years, a power transmission device has also been placed in practical use by interposing a fluid coupling which is a fluid transmission device simpler than the torque converter between the engine and the transmission of the type of parallel shaft gear mechanism. With the fluid coupling being interposed, the vehicle starts smoothly moving owing to slipping between the pump and the turbine of the fluid coupling and, besides, fluctuation in the engine torque is absorbed during idling contributing to reducing vibration and noise.

The AT vehicles are, usually, equipped with a parking lock device. When the vehicle comes into a halt, the driver moves the speed-change lever to the parking position, whereby the drive wheels of the vehicle are locked and the vehicle is reliably maintained in the halted state. The parking lock device is arranged at a rear portion of the automatic transmission, and works to lock the output shaft of the automatic transmission and the drive wheels by fixing a parking gear to the output shaft of the automatic transmission coupled to the drive wheels or to a rotary shaft coupled to the output shaft and by bringing a parking pawl attached to the housing of the automatic transmission into mesh with the parking gear. The above parking lock device has been disclosed in JP-A-2001-341619 as one of embodiments.

The parking lock device and the operation mechanism for bringing the parking pawl into mesh taught in the above publication will now be described with reference to FIGS. 9(a)-9(c). FIG. 9(a) is a perspective view illustrating the whole constitution, FIG. 9(b) illustrates the constitution of a wedge and the like for moving the parking pawl, and FIG. 9(c) is a view illustrating the wedge after assembled in cross section.

A squarely and continuously indented parking gear 102 is fixed to an output shaft 101 of a transmission. A parking pawl 103 having a pawl portion 103A is fixed to a parking pawl shaft 103B which is supported by bearings of the housing of the transmission, the parking pawl 103 being pushed downward by a spring (torsion coil spring) that is not shown. Under the parking pawl 103, a wedge shaft 104 is arranged extending in a direction at right angles thereto. Referring to the right upper drawing, the parking pawl 103 is pushed down by the spring and is in contact with the wedge shaft 104.

Referring to the right lower drawing, the wedge shaft 104 includes a large-diameter portion 104A and a small-diameter portion 104B. A yoke 105 is fitted onto the large-diameter portion 104A at an end thereof and is coupled thereto by a pin. A wedge 107 is fitted onto the small-diameter portion 104B and is pushed by a coil spring 106 so as to come in contact with an end surface of the large-diameter portion 104A. The wedge shaft 104 is inserted in a hole 108 formed in the housing of the transmission, and a supporter 109 having a tilted surface is arranged in front of the wedge 107. A foot portion formed on the yoke 105 fits to an end of a parking lever 110 which is fixed to a lever shaft 110A so as to turn.

A speed-change lever operated by a driver is coupled to a selector lever 111A fixed to an end of a parking operation shaft 111. A plate 111B is fixed to the parking operation shaft 111. If the driver operates the speed-change lever in the A-direction up to a parking position, the parking lever 110 turns via the plate 111B, pin 111C and auxiliary lever 110B, and the wedge shaft 104 moves in the B-direction in the left drawing (toward the left in the right upper drawing). The wedge 107 fitted onto the wedge shaft 104 is pushed by the coil spring 106 (compression coil spring), moves together with the wedge shaft 104, and its lower surface slides on the supporter 109 while its upper surface pushes the parking pawl 103 up in the C-direction. Namely, the wedge 107 works as a cam for pushing the parking pawl 103 up, causing the pawl portion 103A of the parking pawl to be brought into mesh with a dented portion of the parking gear 102 to block the turn of the output shaft 101 of the transmission.

Upon operating the speed-change lever to the parking position, the parking pawl 103 is pushed up. At this moment, the pawl portion 103A of the parking pawl is not always at a position where it is in agreement with the dented portion of the parking gear 102 but often comes in contact with the protruded portion thereof. If the pawl portion 103A comes in contact with the protruded portion, motion of the wedge 107 is interrupted on its way. Therefore, the wedge shaft 104 only moves in the B-direction. However, since the wedge 104 has been pushed by the coil spring 106, the parking gear 102 fixed to the output shaft 101 slightly turns and the pawl portion 103A comes into agreement with the dented portion. Then, the wedge 107 moves toward the left permitting the pawl portion 103A of the parking pawl to come in mesh with the dented portion of the parking gear.

The parking lock device is a mechanism mounted in the last part of the transmission and causes an increase in the overall length of the transmission. A vehicle has only a limited space for arranging the power transmission device. Therefore, the parking lock device must be constituted as compactly as possible and it is, particularly, desired that the parking lock device has a reduced size in the axial direction of the transmission.

Further, the packing lock device is provided for the AT vehicles mounting an automatic transmission equipped with a torque converter but is not usually provided for the MT vehicles capable of so-called gear-engaged parking with the transmission being coupled to the engine through a friction clutch. However, there a variety kinds of vehicles used for various purposes. For example, a truck may be equipped with a crane for loading and unloading cargos, and the power for operating the crane may be taken out from the engine mounted on the vehicle by using a power take-out shaft called PTO shaft. When the above work vehicle equipped with the PTO shaft is in operation while parking the vehicle, the engine is running with the transmission at the neutral position. Therefore, the vehicle cannot be gear-engage parked. Should the vehicle starts moving during the working, the operation will be seriously hampered often causing unexpected damage to the surrounding. Though the vehicle is usually equipped with a parking brake, the vehicles having the PTO shaft may often require another braking system for reliably maintaining the vehicles in a halted state during the working.

When the MT vehicle mounting the transmission of the type of parallel shaft gear mechanism is to be additionally furnished with a parking lock device to reliably prevent the vehicle from unexpectedly moving, it is desired that the parking lock device is mounted without changing the shape and size of the existing transmission as much as possible. Further, if the basic shape and size of the transmission are maintained unchanged, the basic transmission can be used in common for manufacturing a variety of kinds of vehicles irrespective of whether the parking lock device is provided, making it possible to decrease the cost for the production or assembling.

The problem of the present invention is to mount a parking lock device on a transmission without modifying the constitution of the base transmission as much as possible, the parking lock device being constituted in a compact size and having a short length in the axial direction of the transmission.

DISCLOSURE OF THE INVENTION

In view of the above problem according to the present invention, a first coupling member is fitted to a rear end portion of the output shaft of a transmission, a second coupling member having an extended shaft portion formed in the same shape as the rear end portion of the output shaft of the transmission is integrally coupled thereto, and a continuously indented portion is formed along the outer circumferential portion of either the first coupling member or the second coupling member so as to use either one of them as a parking gear. That is, as described in claim 1, the present invention is concerned with:

"a parking lock device mounted on a transmission of a vehicle, wherein:

a parking pawl having a pawl portion is mounted on the housing of the transmission;

a first coupling member is coupled to a rear end portion of the output shaft of the transmission integrally therewith, and a second coupling member is coupled to the first coupling member integrally therewith, the second coupling member being supported by the housing of the transmission through a bearing;

the second coupling member is provided with an extended shaft portion formed in the same shape as the rear end portion of the output shaft of the transmission, and a coupling connected to the propeller shaft of the vehicle is coupled to the extended shaft portion integrally therewith; and a continuously indented portion is formed along the outer circumferential portion of either the first coupling member or the second coupling member, and the pawl portion of the parking pawl is brought into mesh with a dented portion of the continuously indented portion when the vehicle is brought to a park-locked state."

In constituting the parking lock device according to the present invention, the first coupling member is coupled to the rear end portion of the output shaft of the transmission integrally therewith, the second coupling member is coupled thereto, the second coupling member having an extended shaft portion formed in the same shape as the rear end portion of the output shaft of the transmission, and a continuously indented portion is formed along the outer circumferential portion of either the first coupling member or the second coupling member to use either one of them as the parking gear. As described above, the parking lock device is installed subsequent to the rear end portion of the output shaft of the transmission, and affects neither the basic structural portion of the transmission such as the speed-changing mechanism based on parallel shaft gears nor the shape of the output shaft of the transmission. What requires the change when the parking lock device is to be added is only the rear end portion of the housing of the transmission which, however, can be coped with by connecting, for example, an auxiliary housing thereto. Therefore, when a new parking lock device is to be added by modifying the vehicle, or when a vehicle equipped with the parking lock device and a vehicle which is not equipped with the parking lock device are to be simultaneously manufactured, the number of the required steps and the cost can be reduced.

Further, the second coupling member has an extended shaft portion formed in the same shape as the rear end portion of the output shaft of the transmission, and the coupling connected to the propeller shaft of the vehicle is integrally coupled to the extended shaft portion. The extended shaft portion has the same shape as the rear end portion of the output shaft of the transmission. Therefore, the extended shaft portion can be added to the vehicle that is not equipped with the parking lock device, i.e., can be coupled to the propeller shaft of the vehicle by simply using the existing coupling that has been fixed to the rear end of the output shaft of the transmission. In other words, the coupling can be used in common irrespective of the presence of the parking rock device. From this point of view, too, therefore, the cost of manufacture or assembling can be reduced when a multiplicity of kinds of vehicles are to be produced.

As described in claim 2, the first coupling member is a member having a through hole at the center thereof and, further, having a flange portion, the through hole being spline-fitted and coupled to the rear end portion of the output shaft of the transmission, the second coupling member is fastened to an end surface of the flange portion by using a fastening fitting, the continuously indented portion is formed along the outer circumferential portion of the flange portion of the first coupling member, and the first coupling member is used as the parking gear. In this case as described in claim 3, it is desired that cylindrical surfaces that closely contact to each other are formed on the second coupling member and on the first coupling member at a portion where the second coupling member is fastened to the flange portion of the first coupling member.

When the constitution of claim 2 is employed, i.e., when the first coupling member has the through hole at the center and has the flange portion and when the continuously indented portion is formed along the flange portion to use the first coupling member as the parking gear, the function of the parking gear can be imparted to the first coupling member while the function for fixing the coupling can be imparted to the second coupling member separately from each other. When the constitution of claim 2 is further employed in this constitution, i.e., when cylindrical surfaces that closely contact to each other are formed in the portion where the second coupling member and the first coupling member are fastened together, the axes can be easily aligned at the time of fastening the members, and the front end of the second coupling member can be supported by the output shaft of the transmission.

As described in claim 4, further, the first coupling member is an annular member having a through hole at the center thereof and, further, having splines formed along the outer circumferential portion and in the through hole thereof, the through hole is spline-fitted and coupled to the rear end portion of the output shaft of the transmission, the second coupling member is a member having a central dented portion with a spline being formed therein and is spline-fitted and coupled to the outer circumferential portion of the first coupling member, the continuously indented portion is formed along the outer circumferential portion of the second coupling member, and the second coupling member is used as the parking gear. In this case as described in claim 5, it is desired that the second coupling member is supported by the housing of the transmission through a bearing at a portion where it is spline-fitted to the first coupling member.

When the constitution of claim 4 is employed, i.e., when the annular member having the through hole at the center thereof and, further, having splines formed in the outer circumferential portion and in the through hole thereof, is used as the first coupling member, the first coupling member becomes simple in the structure and can be easily coupled to the second coupling member facilitating the assembling operation. In this case as described in claim 5, the second coupling member can be easily supported by the housing of the transmission through a bearing at the portion where the second coupling member is spline-fitted to the first coupling member, and the transmission shaft for driving the wheels can be more stably supported.

As described in claim 6, it is desired that the operation mechanism for operating the parking pawl includes a follow lever coupled to a wedge cam for moving the parking pawl and a main lever fixed to a parking operation shaft supported by the housing of the transmission through a shaft, wherein the follow lever is loosely fitted to the parking operation shaft and is pushed onto the main lever by a torsion coil spring fitted to the parking operation shaft.

In the operation mechanism described in claim 6, the main lever is fixed to the parking operation shaft that turns responsive to the speed-change lever operated by the driver, the follow lever is loosely fitted to the parking operation shaft, the wedge cam is coupled to the follow lever, and the two levers are coupled together by the torsion coil spring fitted to the parking operation shaft. Upon employing the above operation mechanism, if the pawl portion of the parking pawl comes in contact with the protruded portion of the parking gear establishing a "standby" state until the parking gear turns by a slight amount, the torsion coil spring fitted to the parking operation shaft pushes the wedge cam toward the parking pawl, requiring neither the conventionally employed wedge shaft nor the coil spring that has a large length in the axial direction. Therefore, the parking lock device has a decreased length in the axial direction and the device as a whole can be realized in a small size. The parking lock device realized in a compact size can be accommodated in an auxiliary housing that is constructed in a small size and in a reduced weight.

As described in claim 7, the parking lock device of the present invention is favorably used for a vehicle in which a PTO shaft for driving work equipment is connected to the power transmission device. With the parking lock device of the present invention being applied to the above vehicle, the vehicle is reliably maintained in a halted state when the working equipment is driven by running the engine with the vehicle at rest. Even in case the power of the engine happens to be transmitted to the wheels due to some cause, the vehicle is prevented from moving unexpectedly.

As described in claim 8, further, a great effect is exhibited even when the parking lock device of the invention is applied to a vehicle having a fluid transmission device interposed in the power transmission device. The vehicle having the fluid transmission device interposed in the power transmission device is not capable parking with the gear being locked because of slipping in the fluid transmission device. By applying the parking lock device of the present invention, however, it is made possible to prevent the vehicle from moving unexpectedly.

BRIEF DESCRIPTION OF THE DRAWINGS

FIG. 2(*a*) is a side view illustrating in detail a first coupling member according to the first embodiment;

FIG. 2(*b*) is a front view illustrating in detail a first coupling member according to the first embodiment;

FIG. 2(*c*) is a side view illustrating in detail a first coupling member according to the first embodiment;

FIG. 4(*a*) is a perspective view of the operation device in the parking lock device of the present invention;

FIG. 4(*b*) is a perspective view of the operation device in the parking lock device of the present invention;

FIG. 6(*b*) is an operation view of the operation device;

FIG. 6(*c*) is an operation view of the operation device;

FIG. 6(*d*) is an operation view of the operation device;

FIG. 8(*b*) is a side view illustrating in detail a second coupling member according to the second embodiment;

FIG. 8(*c*) is a side view illustrating in detail a second coupling member according to the second embodiment;

FIG. 9(*a*) is a view illustrating a conventional parking lock device;

FIG. 9(*b*) is a view illustrating a conventional parking lock device; and

FIG. 9(*c*) is a view illustrating a conventional parking lock device.

BEST MODE FOR CARRYING OUT THE PRESENT INVENTION

Described below with reference to the drawings is a transmission in the power transmission device for vehicles equipped with a parking lock device of the present invention. The transmission exemplified here is a transmission of the type of parallel shaft gear mechanism mainly employed for the MT vehicles and, as is well known, comprises a main shaft integral with the output shaft and a counter shaft arranged in parallel therewith, wherein a speed-change gear and a counter gear which are loosely fitted to the main shaft and fixed to the counter shaft rotate in mesh at all times, and a speed-change sleeve is operated by using a shift rod to couple a desired speed-change gear to the main shaft to thereby change the speed.

Figure 1:
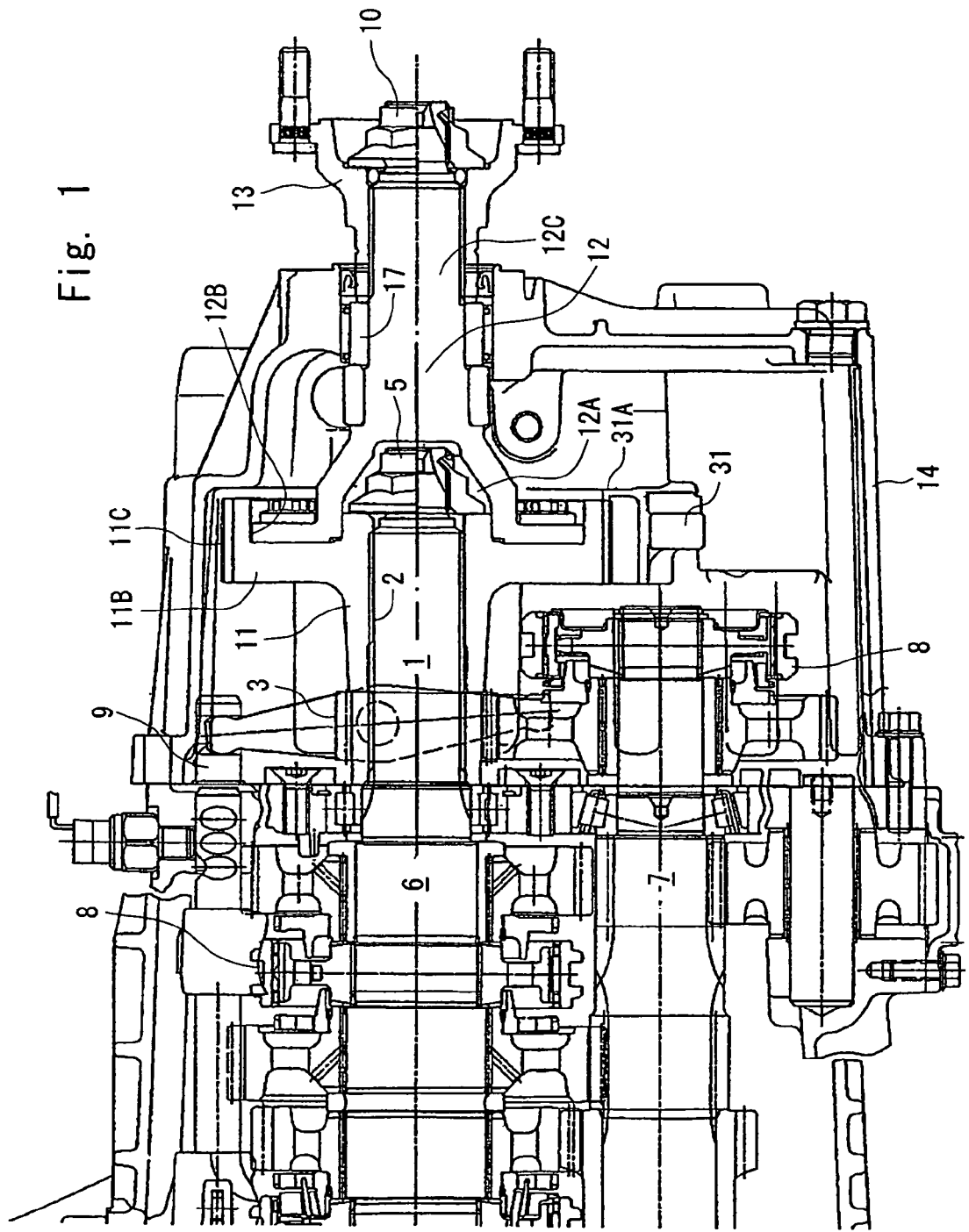
FIG. 1 is a whole view illustrating a first embodiment of a parking lock device of the present invention.

FIG. 1 illustrates the whole constitution of the parking lock device according to a first embodiment of the present invention, and FIGS. 2(a)-2(c) illustrate in detail a first coupling member which is a part that works as a parking gear. A spline 2 is formed in the output shaft 1 of the transmission along the outer circumference thereof, and a speed-change gear 3 of the last portion is fitted onto the spline 2. A first coupling member 11 is fitted to the rear end portion of the output shaft 1 of the transmission and is integrally coupled to the output shaft 1 together with the speed-change gear 3 by using a fixing nut 5 arranged at the rearmost end of the output shaft 1. Referring to FIGS. 2(a)-2(c), the first coupling member 11 has a through hole 11A at the center thereof and in which the output shaft 1 is inserted. A spline is formed in the through hole 11A so as to be fitted to the output shaft 1. The first coupling member 11, further, has a flange portion 11B of a large diameter at the rear end thereof. A continuously indented portion 11C is formed in the flange portion 11B along the outer circumference thereof so as to work as a parking gear, and a parking pawl 31 provided with a pawl portion 31A is arranged on the lower side thereof (for easy understanding, FIG. 1 does not show the operation mechanism for the parking pawl 31, which, however, will be described later).

Reference numeral 6 denotes a main shaft of the transmission, 7 denotes a counter shaft, 8 denotes a speed-change sleeve and 9 denotes a shift rod. These parts are constituted in the same manner as those of a conventional transmission.

An annular dented portion 11D is formed in the rear surface of the flange portion 11B of the first coupling member 11, the annular dented portion 11D having a boss at the center thereof. A second coupling portion 12 is fitted into the annular recessed portion 11D, and as shown in FIG. 1, the fixing nut 5 is accommodated in a central dented portion 12A formed in the front part of the second coupling member 12. The second coupling member 12 has the shape of a flange at the front part thereof, and its cylindrical surface 12B along the outer circumference thereof is closely contacted to a cylindrical surface 11E along the outer circumference of the annular dented portion 11D of the first coupling member 11. That is, the second coupling member 12 and the first coupling member 11 are establishing a so-called "socket and spigot joint" with fastenings such as bolts or the like. The "socket and spigot joint" can also be formed by bringing the circumferential surface of the central dented portion 12A of the second coupling member 12 into close contact with the cylindrical surface (outer circumferential surface of the boss) on the inner circumference in the annular dented portion 11D of the first coupling member 11.

The second coupling member 12 has an extended shaft portion 12C that is supported by the housing of the transmission through a needle bearing 17. The rear end portion of the extended shaft portion 12C is formed in the same shape as the rear end portion of the output shaft 1 of the transmission, has a spline formed in the same size as that of the spline 2 in the rear end part of the output shaft 1, and to which a fixing nut 10 same as that of the fixing nut 5 can be fastened. A coupling 13 connected to the propeller shaft of the vehicle is fitted to the rear end portion of the extended shaft portion 12C, and is integrally fixed thereto by spline-fitting.

In the parking lock device of the first embodiment, an auxiliary housing 14 is connected to the rear part of the housing of the transmission to accommodate the first coupling member 11 and the second coupling member 12. The second coupling member 12 is supported at its front end by the output shaft 1 of the transmission relying upon the "socket and spigot joint", and its extended shaft portion 12C is supported by the housing 14 through the needle bearing 17. Therefore, the second coupling member 12 is supported at two points preventing vibration of the shaft and stably transmitting the power of the engine to the drive wheels.

In the parking lock device, an indented portion that serves as a parking gear is formed in the first coupling member 11 fixed to the rear end portion of the output shaft 1 of the transmission, and the second coupling member 12 to which the coupling 13 is fixed is fitted to the first coupling member 11 and is coupled thereto integrally. Therefore, the parking lock device can be installed by simply attaching the auxiliary housing 14 without changing the basic constitution of the transmission. Further, the rear end portion of the extended shaft portion 12C is formed in the same shape as the rear end portion of the output shaft 1 of the transmission, and the coupling 13 can also be coupled to the rear end portion of the output shaft 1. Therefore, the transmission can be manufactured even without the parking lock device without changing the coupling 13, either.

Figure 3:
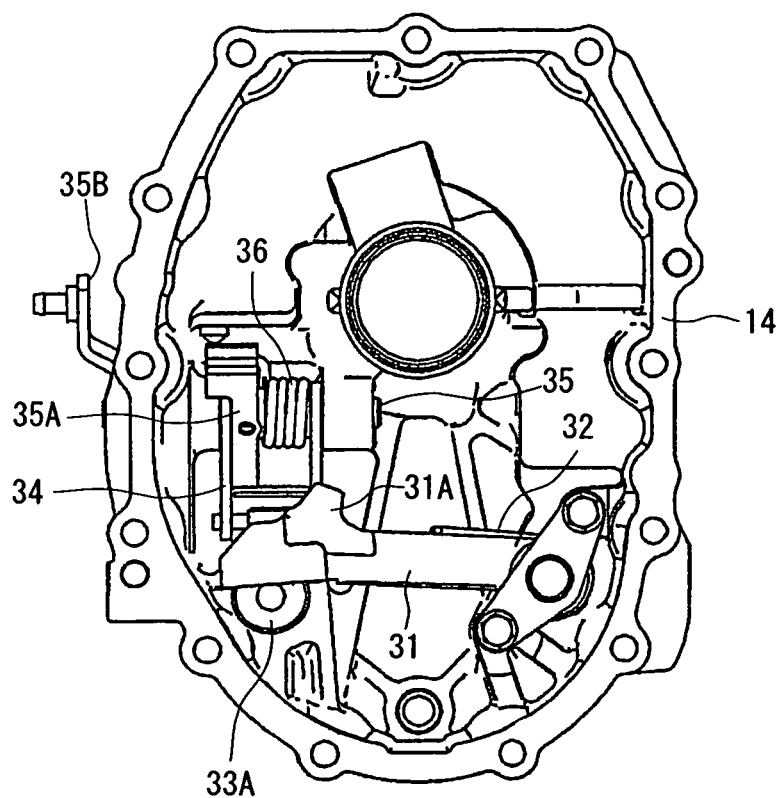
FIG. 3 is a front view illustrating an operation device in the parking lock device of the present invention.
Figure 5:
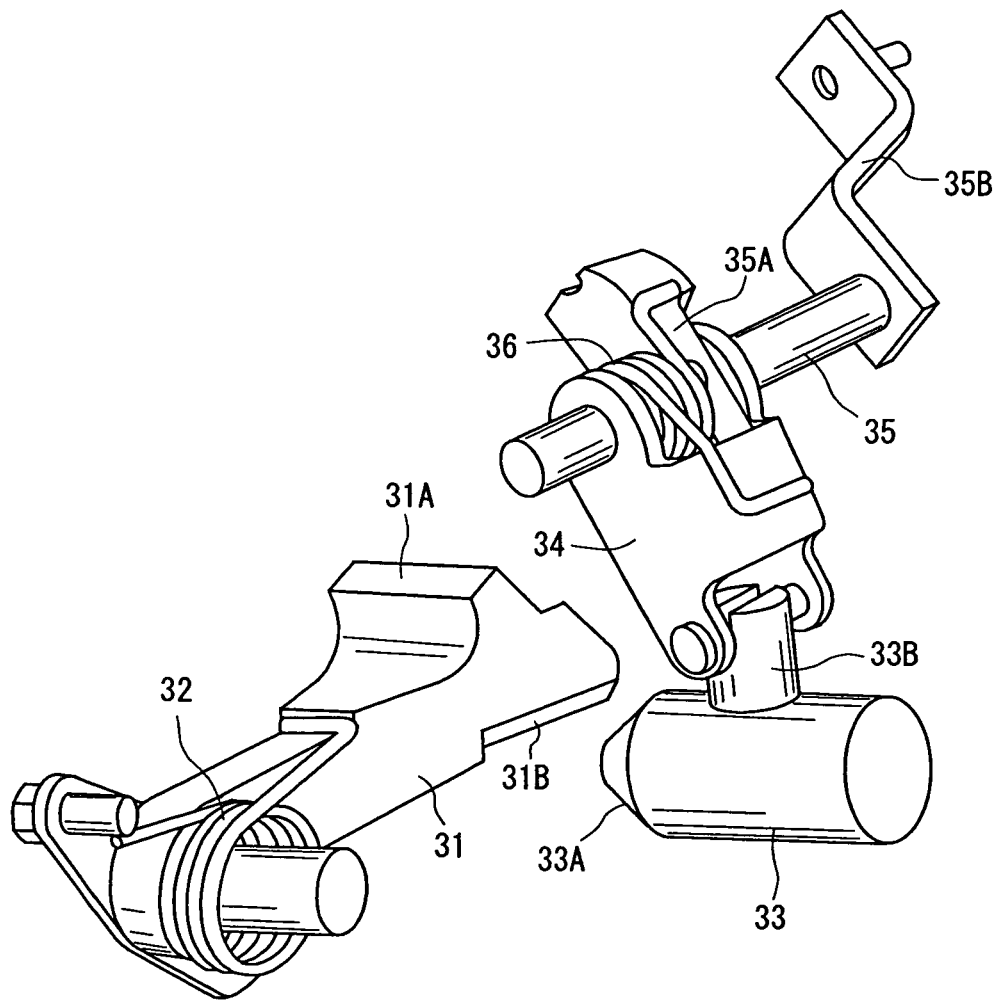
FIG. 5 is a perspective view of major parts in the operation device.
Figure 6:
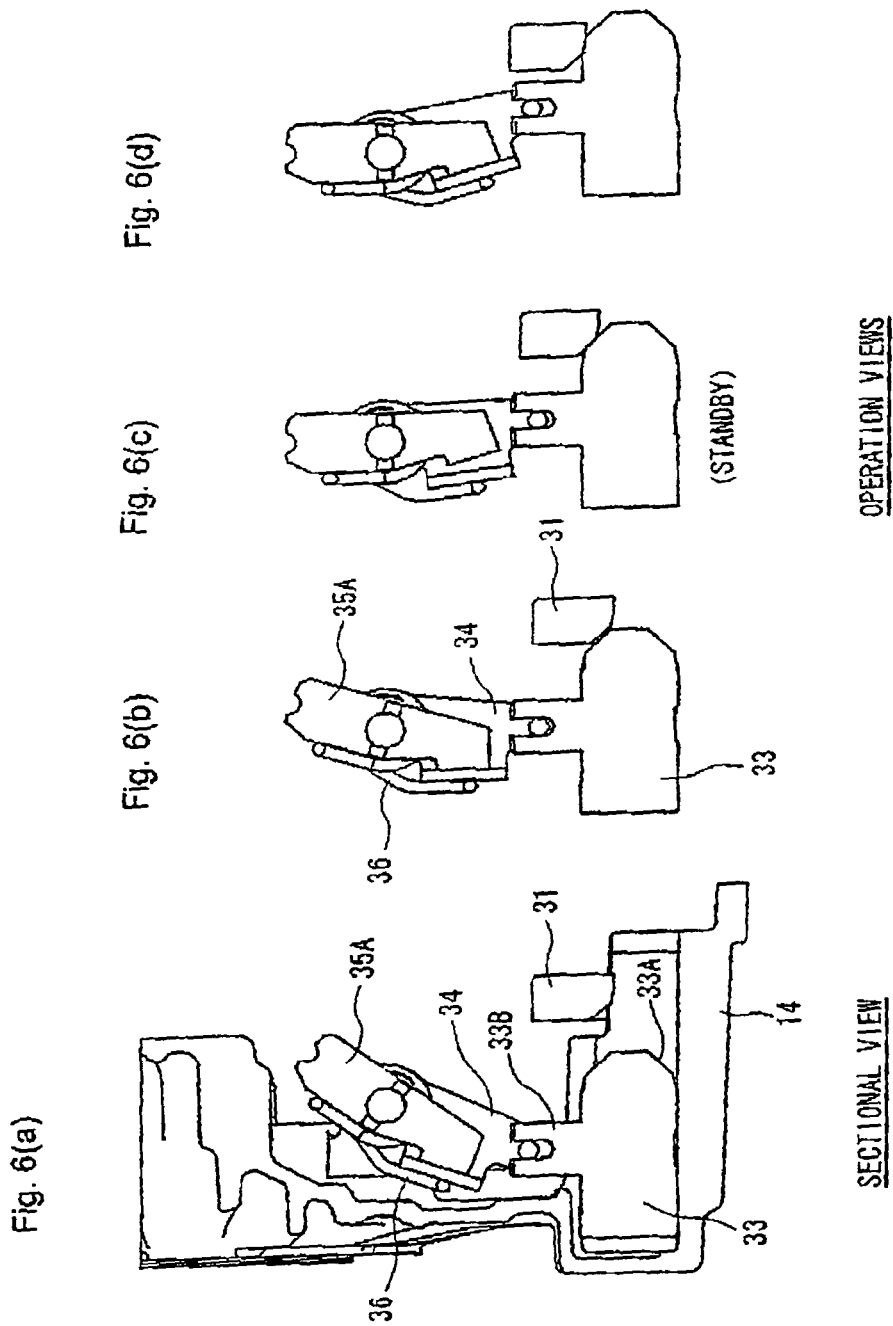
FIG. 6(*a*) is a sectional view and operation views of the operation device.

The operation mechanism for the parking lock device used in the first embodiment will now be described with reference to FIGS. 3 to 6(d). FIG. 3 is a front view of the housing 14 equipped with the operation mechanism, and FIGS. 4(a) and 4(b) are perspective views thereof. For easy comprehension, the first coupling member 11 that serves as the parking gear is not shown in these drawings. FIG. 5 is a perspective view of the parts constituting the operation mechanism, and FIG. 6(a) includes a sectional view and FIGS. 6(b)-6(d) include operation views of the major portions thereof.

As described above, the parking pawl 31 is arranged under the indented portion 11C formed along the outer circumference of the first coupling member 11 (FIG. 1). Referring to FIGS. 3 to 5, the parking pawl 31 is attached to the housing 14 so as to turn, and is pushed down by a torsion coil spring 32. The parking pawl 31 has a pawl portion 31A formed at an upper part thereof to come in mesh with the intended portion 11C of the first coupling member 11 at the time of park locking and, further, has a tilted surface 31B formed at an end lower part thereof to come into engagement with a wedge cam 33 at the time of park locking. To establish the park locked state, the parking pawl 31 is pushed up by the wedge cam 33 and the pawl portion 31A is brought in mesh with the indented portion 11C of the first coupling member 11 that is the parking gear in the same manner as that of the parking lock device disclosed in JP-A-2001-341619.

Referring to FIGS. 5 and 6(a)-6(d), the wedge cam 33 forms a wedge portion 33A having a tilted surface at an end thereof, and has a cylindrical portion 33B erected on an upper part thereof. A groove formed in the cylindrical portion 33B fits to a pin at an end of a follow lever 34. Upon turning the follow lever 34 about a parking operation shaft 35, the wedge cam 33 slides in the axial direction of the output shaft of the transmission. Two pieces of lever plates of the follow lever 34 are loosely fitted, i.e., rotatably fitted to the parking operation shaft 35 which is supported by the housing 14 through a bearing. A main lever 35A is fixed to the parking operation shaft 35, and a torsion coil spring 36 is fitted thereto. The follow lever 34 is pushed by the torsion coil spring 36 onto the main lever 35A. As a result, the follow lever 34 is, usually, integral with the main lever 35A and undergoes the same motion. A parking operation shaft lever 35B is fixed to an end of the parking operation shaft 35, the parking operation shaft lever 35B being fixed to the speed-change lever which is operated by the driver.

When the driver operates the speed-change lever toward the parking position, the parking operation shaft 35 and the main lever 35A turn, and the wedge cam 33 moves in the axial direction to come in contact with the tilted surface of the parking pawl 31 via the follow lever 34 integral with the main lever 35A due to the torsion coil spring 36 (left operation view in FIG. 6(a)). When the driver operates the speed-change lever up to the parking position, the wedge cam 33 further moves toward the parking pawl 31 and pushes it up. Here, if the pawl portion 31A is in agreement with a dented portion in the indented portion 11C, the parking pawl 31 continues to ascend and the pawl portion 31A meshes with the dented portion to place the vehicle in the park locked state.

However, if the pawl portion 31A does not come in agreement with the dented portion but comes in contact with a protruded portion, the parking pawl 31 is prevented from ascending. In this case as shown in the central operation view, the wedge cam 33 and the follow lever 34 are prevented from moving on their way, and the main lever 35A only separates away and moves toward the parking pawl 31. Therefore, the wedge cam 33 is pushed by the torsion coil spring 36 toward the parking pawl 31. Accordingly, the second coupling member integral with the output shaft 1 of the transmission slightly turns, the pawl portion 31A comes in agreement with the dented portion, the parking pawl 31 is pushed up by the wedge cam 33 (right operation view), and the pawl portion 31A fits to the dented portion.

In the operation mechanism for the parking lock device of the invention as described above, a so-called "standby" mechanism for establishing the park locking state is constituted by the main lever 35A fixed to the parking operation shaft 35, follow lever 34 loosely fitted to the shaft thereof and torsion coil spring 36. In the conventional parking lock device of JP-A-2001-341619 described above, the "standby" mechanism of when the pawl portion 103A comes in contact with the protruded portion of the parking gear is constituted by a wedge shaft 104 extending in the axial direction of the transmission, a wedge 107 fitted thereto and a coil spring 106 (compression coil spring). As compared to the conventional device, therefore, the parking lock device of the present invention has a very compact structure and has a decreased length particularly in the axial direction. The housing 14 for accommodating the parking lock device, too, is realized in a small size and in a decreased weight.

Figure 7:
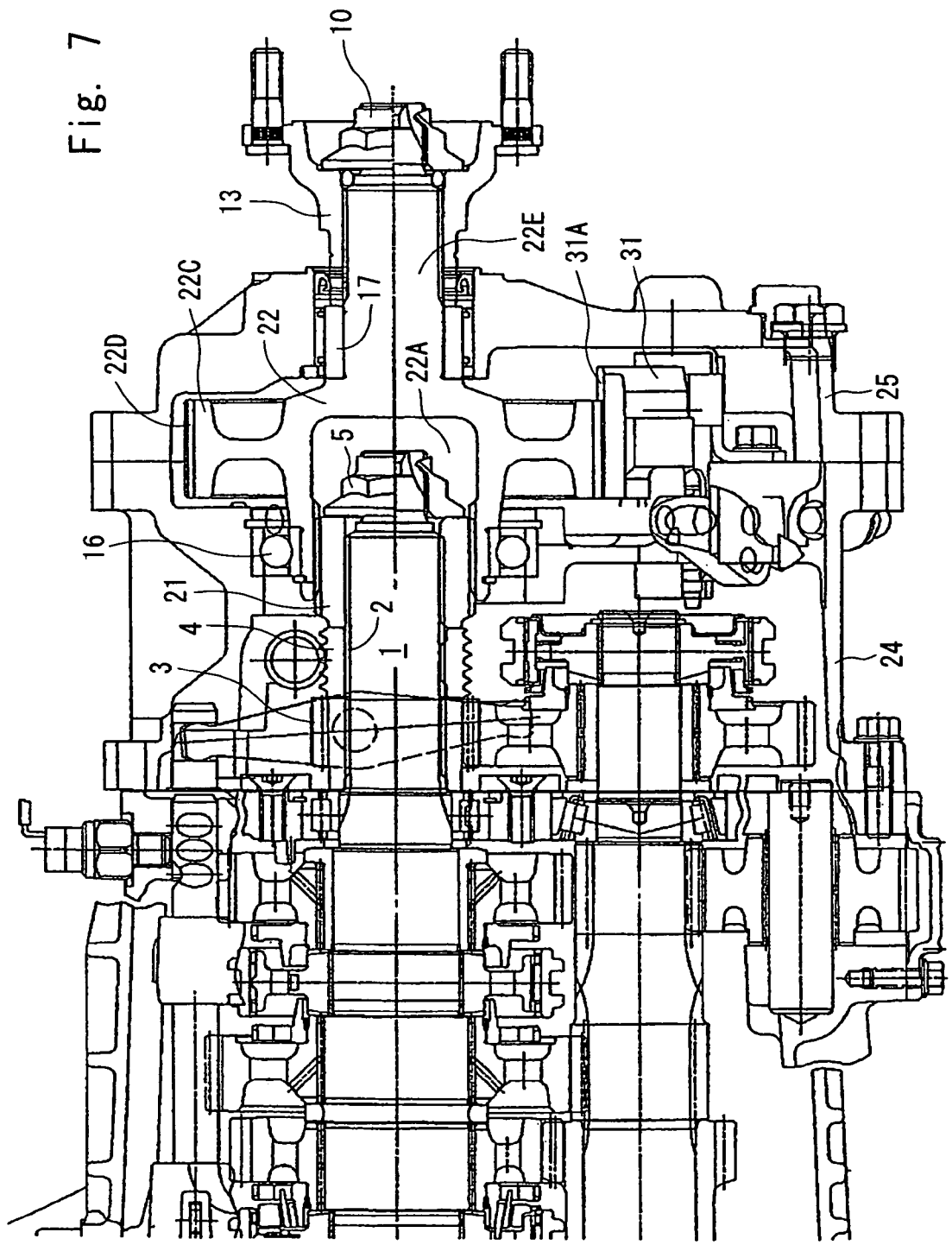
FIG. 7 is a whole view illustrating a second embodiment of the parking lock device of the present invention.

Next, the parking lock device according to a second embodiment of the invention will be described with reference to FIG. 7 which illustrates the whole constitution and FIGS. 8(a)-8(c) which illustrate in detail a second coupling member that works as the parking gear. However, the same portions as those of the first embodiment of FIG. 1 such as the constitutions of basic portions of the transmission are not described here again.

In the parking lock device of the second embodiment, a speed-change gear 3 and a speed gear 4 for detecting the vehicle speed are fitted to the spline 2 of the output shaft 1 of the transmission. A first coupling member 21 is fitted to the rear end portion of the output shaft 1 of the transmission and is integrally coupled to the output shaft 1 by using the fixing nut 5 together with the speed-change gear 3 and the speed gear 4 for detecting the vehicle speed. As will be obvious from FIG. 7, the first coupling member 21 is an annular part having a through hole formed therein, and has splines formed in the through hole and in the outer circumferential portion thereof. The spline of the through hole is fitted to the spline 2 of the output shaft.

Figure 8B:
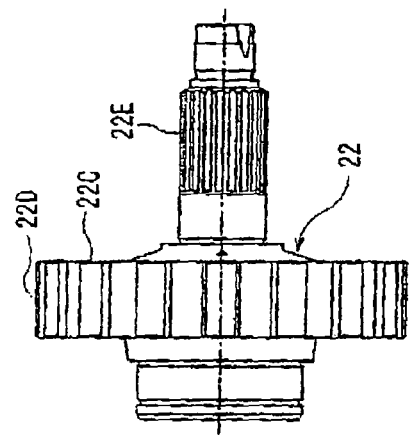
FIG. 8(*a*) is a front view illustrating in detail a second coupling member according to the second embodiment.
Figure 8C:
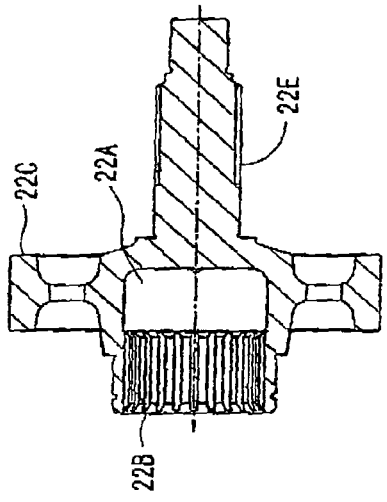
Figure 8A:
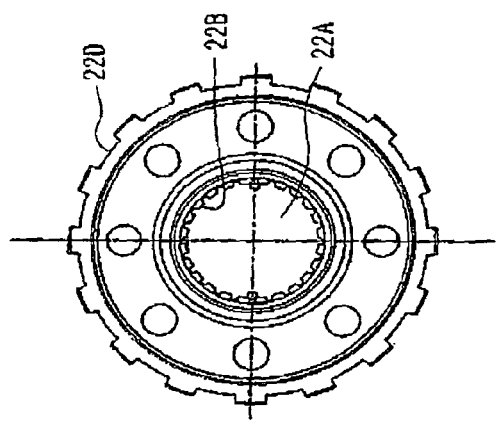

A second coupling member 22 shown in FIGS. 8(a)-8(c) is fitted onto the outer circumferential portion of the first coupling member 21, the fixing nut 5 is accommodated in a central dented portion 22A formed in a front part of the second coupling member 22, and a spline 22B formed in the inner surface of the central dented portion 22A is fitted to the spline formed in the outer circumferential portion of the first coupling member 21. The second coupling member 22 has a flange-like large-diameter portion 22C formed on the intermediate portion thereof, and a continuously indented portion 22D is formed along the outer circumference of the large-diameter portion 22C to come in mesh with a pawl portion 31A of a parking pawl 31 arranged on the lower side thereof. Like in the device of the first embodiment, the second coupling member 22 has an extended shaft portion 22E supported by the housing of the transmission through a bearing, the rear end portion of the extended shaft portion 22E being formed in the same shape as that of the rear end portion of the output shaft 1 of the transmission. Therefore, a fixing nut 10 which is the same as the fixing nut 5 can be fastened thereto, and the coupling 13 connected to the propeller shaft of the vehicle can also be integrally fixed by spline-fitting to the rear end portion of the extended shaft portion 22E and even to the rear end portion of the output shaft 1 of the transmission.

In the parking lock device of the second embodiment, auxiliary housings 24 and 25 split into two are connected to the rear side of the housing of the transmission to accommodate the first coupling member 21 and the second coupling member 22. The second coupling member 22 is supported at its front part by the housing 24 through a ball bearing 26 and is supported at its extended shaft portion 21D by the housing 25 through a needle bearing 17. Therefore, the second coupling member 22 is supported at two points preventing vibration of the shaft and stably transmitting the power of the engine to the drive wheels. The auxiliary housing in this embodiment is split into two. It is, however, allowable to use a single auxiliary housing like in the first embodiment.

INDUSTRIAL APPLICABILITY

In constituting the parking lock device of the present invention as described above in detail, the first coupling member is fitted to the rear end portion of the output shaft of the transmission, the second coupling member provided with the extended shaft portion formed in the same shape as the rear end portion of the output shaft of the transmission is coupled thereto integrally, the continuously indented portion is formed along the outer circumferential portion of either the first coupling member or the second coupling member, and either one of the two is used as a parking gear. Therefore, the parking lock device of the invention can be used for the transmissions of various kinds of vehicles.

In the above embodiments, the housing for accommodating the parking lock device is formed as a separate auxiliary housing. Depending upon the cases, however, the parking lock device may be accommodated by modifying the rear part of the housing of the transmission that contains the gear mechanism. Further, not being limited to the above embodiments only, the invention can be varied in various ways, such as employing a conventional operation mechanism for the parking lock device, or providing the operation lever for operating the operation mechanism independently from the speed-change lever. It will be further obvious that the parking lock device of the invention can also be applied to automatic transmissions.

The invention claimed is:

1. A parking lock device mounted on a transmission of a vehicle, said transmission comprising a housing and an output shaft, said park lock device comprising:

a parking pawl having a pawl portion mounted on the housing of said transmission;

a first coupling member comprising a through hole at a center thereof, said through hole being spline-fitted to a rear end portion of the output shaft of said transmission;

a second coupling member coupled directly to said first coupling member, the second coupling member being supported by the housing of the transmission through a bearing and being provided with an extended shaft portion formed in a same shape as the rear end portion of the output shaft of said transmission; and a coupling coupled to said extended shaft portion of said second coupling member, said coupling being connected to a propeller shaft of said vehicle, wherein a continuously indented portion is formed along an outer circumferential portion of one of said first coupling member and said second coupling member, such that the pawl portion of said parking pawl is brought into mesh with a dented portion of said continuously indented portion when said vehicle is brought to a park-locked state, wherein said first coupling member further comprises a flange portion, and wherein said second coupling member is fastened to an end surface of said flange portion by using a fastening fitting, and said continuously indented portion is formed along the outer circumferential portion of said flange portion of said first coupling member.

2. The parking lock device according to claim 1, wherein an operation mechanism for operating said parking pawl includes a follow lever coupled to a wedge cam for moving said parking pawl and a main lever fixed to a parking operation shaft supported by the housing of the transmission through a shaft, and wherein said follow lever is loosely fitted to said parking operation shaft and is pushed onto said main lever by a torsion coil spring fitted to said parking operation shaft.

3. The parking lock device according to claim 1, wherein a PTO (power take-out) shaft for driving a work equipment is connected to a power transmission device of said vehicle.

4. The parking lock device according to claim 1, wherein a fluid transmission device is interposed in a power transmission device of said vehicle.

5. A parking lock device mounted on a transmission of a vehicle, said transmission comprising a housing and an output shaft, said park lock device comprising:

a parking pawl having a pawl portion mounted on the housing of said transmission;

a first coupling member coupled to a rear end portion of the output shaft of said transmission, and a second coupling member coupled directly to said first coupling member, the second coupling member being supported by the housing of the transmission through a bearing and being provided with an extended shaft portion formed in a same shape as the rear end portion of the output shaft of said transmission, said first coupling member comprising a through hole at a center thereof and a flange portion, said through hole being spline-fitted to the rear end portion of the output shaft of said transmission, and said second coupling member being fastened to an end surface of said flange portion by using a fastening fitting, and each of said first coupling member and said second coupling member having cylindrical surfaces that closely contact to each other at the fastening; and a coupling coupled to said extended shaft portion of said second coupling member, said coupling being connected to a propeller shaft of said vehicle, wherein a continuously indented portion is formed along an outer circumferential of the flange portion of said first coupling member, such that the pawl portion of said parking pawl is brought into mesh with a dented portion of said continuously indented portion when said vehicle is brought to a park-locked state.

6. The parking lock device according to claim 5, wherein an operation mechanism for operating said parking pawl includes a follow lever coupled to a wedge cam for moving said parking pawl and a main lever fixed to a parking operation shaft supported by the housing of the transmission through a shaft, and wherein said follow lever is loosely fitted to said parking operation shaft and is pushed onto said main lever by a torsion coil spring fitted to said parking operation shaft.

7. The parking lock device according to claim 5, wherein a PTO (power take-out) shaft for driving a work equipment is connected to a power transmission device of said vehicle.

8. The parking lock device according to claim 5, wherein a fluid transmission device is interposed in a power transmission device of said vehicle.

9. A parking lock device mounted on a transmission of a vehicle, said transmission comprising a housing and an output shaft, said parking lock device comprising:

a parking pawl having a pawl portion mounted on the housing of said transmission;

a first coupling member coupled to a rear end portion of the output shaft of said transmission, and a second coupling member coupled directly to said first coupling member, said second coupling member being supported by the housing of the transmission through a bearing, and being provided with an extended shaft portion formed in a same shape as the rear end portion of the output shaft of said transmission, said first coupling member comprising a through hole at a center thereof and splines formed along an outer circumferential portion, said through hole being spline-fitted to the rear end portion of the output shaft of said transmission, and said second coupling member being spline-fitted to the outer circumferential portion of said first coupling member; and a coupling coupled to said extended shaft portion of said second coupling member, said coupling being connected to a propeller shaft of said vehicle, wherein a continuously indented portion is formed along an outer circumferential portion of said second coupling member, such that the pawl portion of said parking pawl is brought into mesh with a dented portion of said continuously indented portion when said vehicle is brought to a park-locked state.

10. The parking lock device according to claim 9, wherein said second coupling member is supported by the housing of said transmission through a bearing at a portion where it is spline-fitted to said first coupling member.

11. The parking lock device according to claim 10, wherein an operation mechanism for operating said parking pawl includes a follow lever coupled to a wedge cam for moving said parking pawl and a main lever fixed to a parking operation shaft supported by the housing of the transmission through a shaft, and wherein said follow lever is loosely fitted to said parking operation shaft and is pushed onto said main lever by a torsion coil spring fitted to said parking operation shaft.

12. The parking lock device according to claim 10, wherein a PTO (power take-out) shaft for driving a work equipment is connected to a power transmission device of said vehicle.

13. The parking lock device according to claim 10, wherein a fluid transmission device is interposed in a power transmission device of said vehicle.

14. The parking lock device according to claim 9, wherein an operation mechanism for operating said parking pawl includes a follow lever coupled to a wedge cam for moving said parking pawl and a main lever fixed to a parking operation shaft supported by the housing of the transmission through a shaft, and
  wherein said follow lever is loosely fitted to said parking operation shaft and is pushed onto said main lever by a torsion coil spring fitted to said parking operation shaft.

15. The parking lock device according to claim 9, wherein a PTO (power take-out) shaft for driving a work equipment is connected to a power transmission device of said vehicle.

16. The parking lock device according to claim 9, wherein a fluid transmission device is interposed in a power transmission device of said vehicle.

17. A parking lock device mounted on a transmission of a vehicle, said transmission comprising a housing and an output shaft, said park lock device comprising:
  a parking pawl having a pawl portion mounted on the housing of said transmission;
  a first coupling member comprising a through hole at a center thereof, said through hole being spline-fitted to a rear end portion of the output shaft of said transmission;
  a second coupling member coupled directly to said first coupling member, the second coupling member being supported by the housing of the transmission through a bearing and being provided with an extended shaft portion formed in a same shape as the rear end portion of the output shaft of said transmission; and
  a coupling coupled to said extended shaft portion of said second coupling member, said coupling being connected to a propeller shaft of said vehicle,
wherein a continuously indented portion is formed along an outer circumferential portion of one of said first coupling member and said second coupling member, such that the pawl portion of said parking pawl is brought into mesh with a dented portion of said continuously indented portion when said vehicle is brought to a park-locked state,
  wherein an operation mechanism for operating said parking pawl includes a follow lever coupled to a wedge cam for moving said parking pawl and a main lever fixed to a parking operation shaft supported by the housing of the transmission through a shaft, and
  wherein said follow lever is loosely fitted to said parking operation shaft and is pushed onto said main lever by a torsion coil spring fitted to said parking operation shaft.

* * * * *